US010882017B2

(12) United States Patent  
Armstrong et al.

(10) Patent No.: US 10,882,017 B2  
(45) Date of Patent: Jan. 5, 2021

(54) SYSTEM AND METHOD FOR RAPID, HIGH THROUGHPUT, HIGH PRESSURE SYNTHESIS OF MATERIALS FROM A LIQUID PRECURSOR

(71) Applicant: Lawrence Livermore National Security, LLC, Livermore, CA (US)

(72) Inventors: Mike Armstrong, Livermore, CA (US); Sorin Bastea, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 126 days.

(21) Appl. No.: 16/203,177

(22) Filed: Nov. 28, 2018

(65) Prior Publication Data

US 2020/0164326 A1    May 28, 2020

(51) Int. Cl.
| | |
|---|---|
| *B01J 3/08* | (2006.01) |
| *B01J 3/06* | (2006.01) |
| *C01B 32/26* | (2017.01) |
| *C01B 32/15* | (2017.01) |
| *C01B 32/18* | (2017.01) |

(52) U.S. Cl.  
CPC .............. *B01J 3/08* (2013.01); *B01J 3/062* (2013.01); *C01B 32/15* (2017.08); *C01B 32/18* (2017.08); *C01B 32/26* (2017.08); *B01J 2203/0605* (2013.01); *B01J 2203/068* (2013.01); *B01J 2203/0655* (2013.01); *C01P 2004/64* (2013.01)

(58) Field of Classification Search  
None  
See application file for complete search history.

(56) References Cited

U.S. PATENT DOCUMENTS

| | | | | |
|---|---|---|---|---|
| 4,367,130 | A | * | 1/1983 | Lemelson .................. B01J 3/08 204/157.42 |
| 5,397,961 | A | * | 3/1995 | Ayers ....................... H05H 1/24 315/111.21 |
| 2013/0062193 | A1 | * | 3/2013 | Proudkii ................ B01J 19/088 204/157.15 |
| 2013/0221141 | A1 | * | 8/2013 | Zhang ................... B02C 19/065 241/39 |

(Continued)

OTHER PUBLICATIONS

Nüske, R., Jurgilaitis, A., Enquist, H., Harb, M., Fang, Y., Håkanson, U. and Larsson, J., 2012. Transforming graphite to nanoscale diamonds by a femtosecond laser pulse. Applied Physics Letters, 100(4), p. 043102.

(Continued)

*Primary Examiner* — Mary Lynn F Theisen  
(74) *Attorney, Agent, or Firm* — Harness, Dickey & Pierce, P.L.C.

(57) ABSTRACT

The present disclosure relates to a system and method for synthesis of condensed, nano-carbon materials to create nanoparticles. In one embodiment the system may have a source of liquid precursor, a flow control element and a shock wave generating subsystem. The flow control element is in communication with the source of the liquid precursor and creates a jet of liquid precursor. The shock wave generating subsystem drives a shock wave through at least a substantial portion of a thickness of the jet of liquid precursor to sufficiently compress the jet of liquid precursor, and to increase a pressure and a temperature of the jet of liquid precursor, to create solid state nanoparticles.

22 Claims, 4 Drawing Sheets

(56) References Cited

U.S. PATENT DOCUMENTS

2014/0161710 A1* 6/2014 Zousman ................ C01B 32/26
423/446
2019/0263665 A1* 8/2019 Newman ................ C01B 32/26

OTHER PUBLICATIONS

Yang, G.W., Wang, J.B. and Liu, Q.X., 1998. Preparation of nano-crystalline diamonds using pulsed laser induced reactive quenching. Journal of Physics: Condensed Matter, 10(35), p. 7923.

* cited by examiner

SYSTEM AND METHOD FOR RAPID, HIGH THROUGHPUT, HIGH PRESSURE SYNTHESIS OF MATERIALS FROM A LIQUID PRECURSOR

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to the production of nanoparticles, and more particularly to systems and methods for producing nano-diamonds and other nano-carbon allotropes such as nano-onions, which do not require the detonation of conventional high explosives and the use of conventional static compression cells, and which can provide significantly improved throughput of nano-carbon forming operations.

BACKGROUND

This section provides background information related to the present disclosure which is not necessarily prior art.

Nano-diamonds are used in a wide variety of commercial applications, and may be synthesized using a variety of methods. The creation of diamond materials (including nano-diamonds) requires the compression of carbon to high pressure (~16 GPa) and is facilitated by high temperature. Generally, static compression of materials is commonly used to synthesize materials (such as diamond) which can only be obtained under high pressure. There are many instances of materials which can only be synthesized at high pressure, where variation with applied pressure of fundamental properties such as chemical reactivity and crystal structure may be employed to facilitate synthesis.

One principal obstacle to the high throughput synthesis of materials at high pressure is the typically small volume of material required to obtain gigapascal pressures in conventional static compression cells. Although large volume cells can also be used to obtain high pressure, these cells are limited in pressure due to fundamental physical constraints on the strength of present day pressure cell components. Further, in many instances, rapid synthesis of materials requires high temperatures that may be difficult to obtain in conventional static compression cells. Finally, it can be particularly difficult to control the kinetics of material synthesis, particularly in high volume cells where thermodynamic conditions of pressure and temperature are difficult to uniformly prepare. Nevertheless, material transformation kinetics may be another tool to obtain unconventional material syntheses, such as the synthesis of nanoparticles.

Currently, nano-diamonds are often synthesized in volume via detonation of high explosives, but this method has a number of limitations. Perhaps the most significant is that the products require costly purification and refinement.

Figure 1:
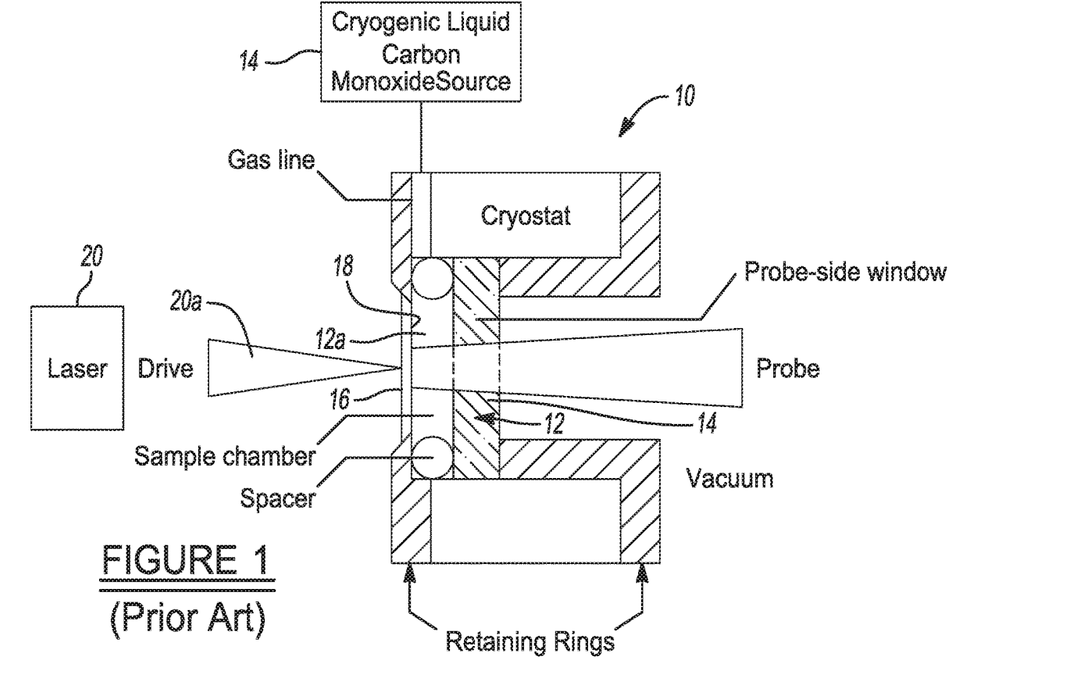
FIG. 1 is a diagram of one embodiment of a cryogenic containment cell for laser-driven compression of liquid carbon monoxide.

Synthesis of condensed nano-carbon materials (such as nano-diamonds and nano-onions) via laser-driven shock compression is an example employing a similar technique, where shock compression of cryogenic liquid carbon monoxide via a metal ablator obtains a thermodynamic state favoring liquid carbon at high pressure. For this application, one example of a prior art compression cell configuration 10 is shown in FIG. 1. Gas from a carbon monoxide (CO) source 14 is condensed at low temperature in a cell 12 comprising a window 16. The interior of the cell 12 forms a cell chamber 12a. The window 16 has an internal aluminum coating 18 which acts as an ablation layer. Once liquid CO has been condensed within the cell chamber 12a, a laser pulse 20a from a laser source 20 may be directed toward the cell 12. The laser pulse 20a drives a shock wave through the aluminum coating 18 into the liquid CO sample inside the cell chamber 12a. This shock wave increases the pressure acting on the CO inside the cell 12 to approximately 20 GPa, and the temperature to several thousand degrees Kelvin. Under these conditions, liquid carbon is thermodynamically favored, and nanoscale liquid carbon drops precipitate from the hot, compressed CO. These conditions last for the duration of the laser pulse 20a.

Figure 2:
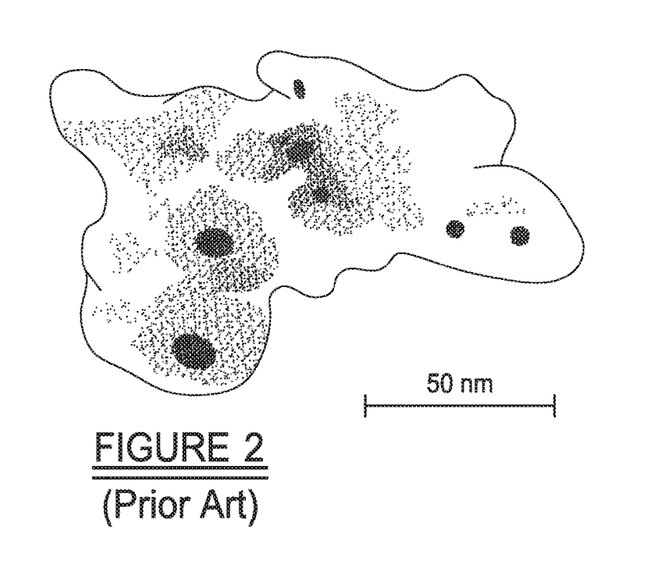
FIG. 2 is a prior art picture showing how carbon nano-condensates subsequent to compression and cooling.
Figure 3:
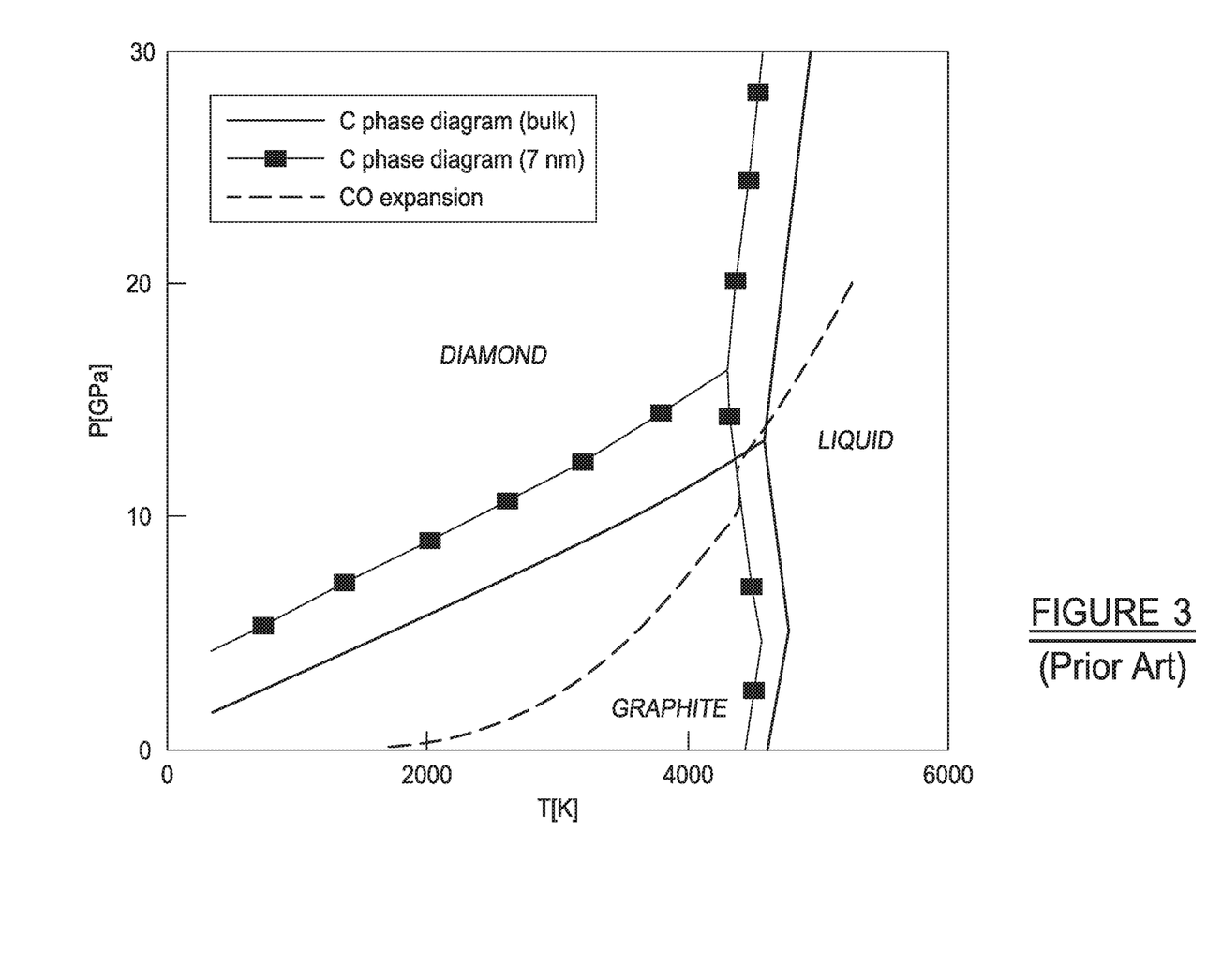
FIG. 3 is a prior art phase diagram showing thermodynamic path from initial shock compression to condensed solid state carbon; corresponding reference numerals indicate corresponding parts throughout the several views of the drawings.

After the laser pulse 20a, the CO sample inside the cell chamber 12a cools and depressurizes on a comparable time scale, (in this example within about 1 nanosecond). As the CO sample cools and depressurizes, precipitated liquid carbon crosses a phase transition boundary into solid state carbon, and solid-state carbon condenses from nanoscale liquid carbon drops. FIG. 2 shows a highly magnified illustration of the carbon nano-condensates created subsequent to compression and cooling, along with a dimensional indicator indicating the scale of the carbon condensates. FIG. 3 shows a phase diagram illustrating the thermodynamic path from initial shock compression to condensed solid state carbon.

The above described process explicitly employs the kinetics of single phase carbon precipitation to obtain nanoparticles, and demonstrates the basic principle of obtaining solid state carbon from the nanoscale liquid carbon drops. However, as explained above, since this method requires the use of a cell and an ablator material, its throughput is significantly limited.

Accordingly, there remains a need in the art for a system and method which is able to generate nano-diamonds, and which has a high throughput, and which is able to generate pure material using a straightforward synthesis method. A new method such as described above for synthesizing nano-diamonds which provides significantly higher throughput than present day manufacturing techniques, would be of significant commercial interest and importance.

SUMMARY

This section provides a general summary of the disclosure, and is not a comprehensive disclosure of its full scope or all of its features.

In one aspect the present disclosure relates to a system and method for synthesis of condensed, nano-carbon materials to create nanoparticles. In one embodiment the system may have a source of liquid precursor, a flow control element and a shock wave generating subsystem. The flow control element is in communication with the source of the liquid precursor and creates a jet of liquid precursor. The shock wave generating subsystem drives a shock wave through at least a substantial portion of a thickness of the jet of liquid precursor to sufficiently compress the jet of liquid precursor, and to increase a pressure and a temperature of the jet of liquid precursor, to create solid state nanoparticles.

In another aspect the present disclosure relates to a system for synthesis of condensed, nano-carbon materials to create nanoparticles. The system may comprise a source of liquid precursor and a flow nozzle in communication with the source of the liquid precursor. The flow nozzle creates a jet of liquid precursor exiting the flow nozzle. A laser is included for generating at least one laser pulse aimed along a path perpendicular to a path of travel of the jet of liquid precursor. The laser pulse impinges the jet of liquid precursor as the jet of liquid precursor falls. The laser pulse has sufficient power to drive a shock wave through the jet of liquid precursor to sufficiently compress the jet of liquid precursor, and to increase a pressure and a temperature of the jet of liquid precursor, to thus create solid state nanoparticles.

In still another aspect the present disclosure relates to a method for synthesis of condensed, nano-carbon materials to create nanoparticles. The method may comprise controlling a release of a liquid precursor to create a jet of liquid precursor, and using an electromagnetic wave energy source to generate a beam directly at the jet of liquid precursor as the jet of liquid precursor falls through a predefined region intersecting a path of the beam. The method may further include using the beam to impinge the jet of liquid precursor. The beam may have sufficient power to drive a shock wave at least substantially through a thickness of the jet of liquid precursor. The shock wave compresses the jet of liquid precursor and increases both a pressure and a temperature of the jet of liquid precursor, to thus create solid state nanoparticles.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The present disclosure relates to systems and methods for high throughput, high pressure synthesis of materials using, in one embodiment and methodology, dynamic, laser-driven compression of liquids, including cryogenic liquids. The systems and methods disclosed herein present several advantages compared to conventional static compression of liquids, particularly: 1) reactants can be introduced as a controlled flow jet, which does not require a solid container, 2) synthesis of solid products can be obtained at high concentration, where liquid reactants can be removed via evaporation, 3) unused reactants can be easily evaporated, filtered, re-condensed as liquid and recycled, 4) high throughput is not limited by the intrinsic volume or mechanical assembly of high pressure cells, 5) dynamic compression is a rapid, highly controllable process which may readily obtain a wide range of thermodynamic states (including variation of both pressure and temperature) as well as timescales which may employ material transformation kinetics, 6) the systems and methods disclosed herein are straightforward to parallelize for high throughput, 7) the systems and methods disclosed herein are particularly amenable to the synthesis of nanomaterials, and 8) the systems and methods disclosed herein have intrinsically high throughput.

Figures 4, 5:
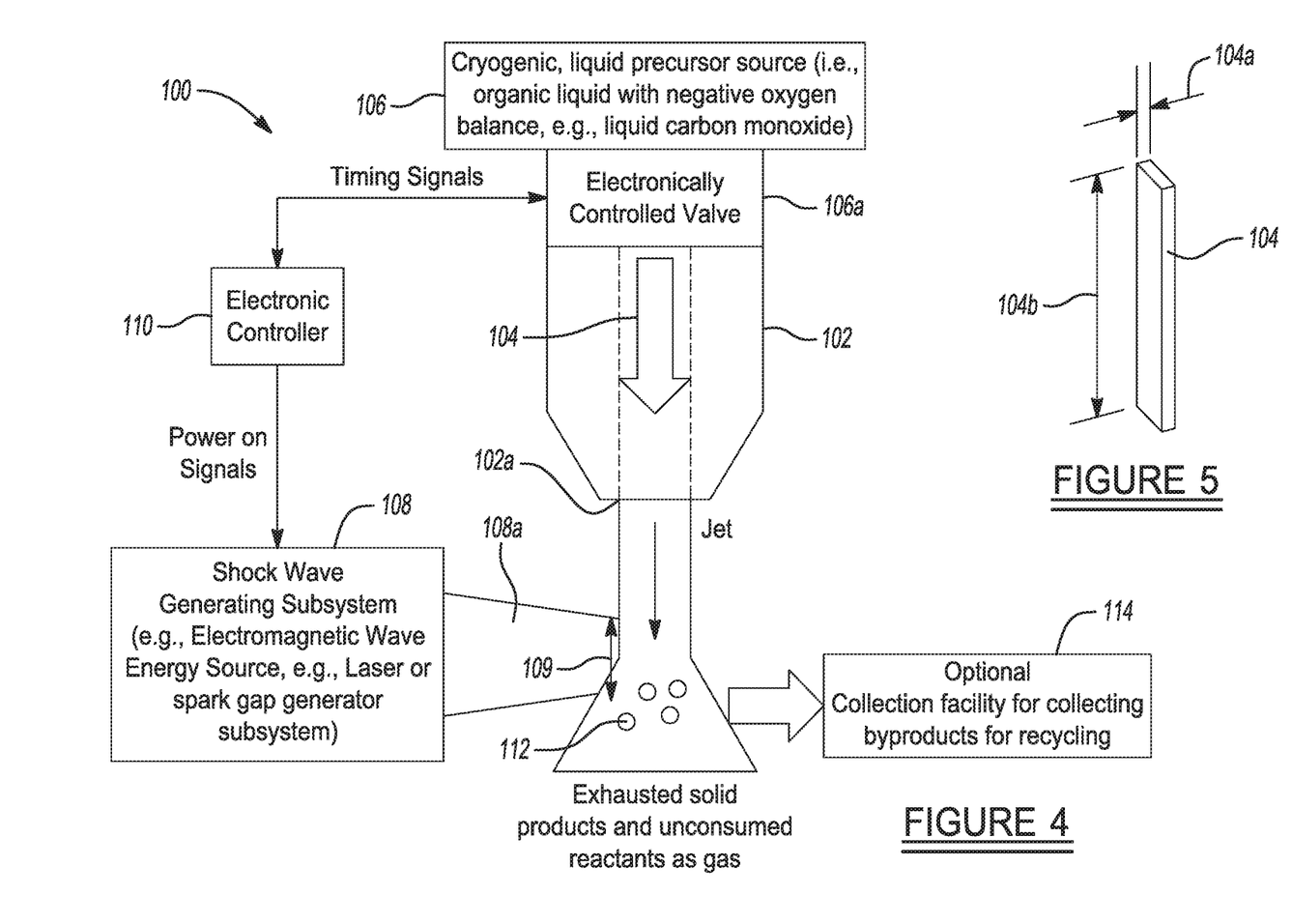
FIG. 4 is a block diagram of one embodiment of a system in accordance with the present disclosure which may be used to create nanoparticles without the use of a cell and ablator material.
FIG. 5 shows a perspective view of one example shape for a liquid jet created from the nozzle used in the system of FIG. 4, where the liquid jet forms a generally rectangular sheet of fluid.

One embodiment of a system 100 in accordance with the present disclosure is shown in FIG. 4, which makes use of a flow control element, in this example a flow nozzle 102, for creating a liquid jet 104 from a liquid precursor source 106. The liquid jet 104 is compressed by direct impingement of a laser beam. In this example the liquid precursor source 106 may comprise any form of carbon-rich organic liquid. One suitable organic liquid is cryogenic liquid carbon monoxide (CO), although the system 100 is not limited to use with only liquid carbon monoxide, but may use any suitable liquid precursor, for example and without limitation, ethanol, isopropanol, etc.

The system 100 may include a shock wave generating subsystem 108, which may comprise an electromagnetic wave energy source 108 for generating an electromagnetic energy wave beam 108a. In one specific implementation the electromagnetic wave energy source 108 may comprise, for example, a laser, and the beam may comprise a laser beam. Alternatively, a subsystem for generating a spark gap may also be used to generate high pressure shocks, although it is believed that in most instances a laser will be preferred. Accordingly, the system 100 is not limited to use with any particular form of shock wave generating subsystem. Merely for convenience, however, the shock wave generating subsystem 108 will be referred to throughout the following discussion as "laser 108", and the beam 108 will be referred to as the "laser beam 108a".

The laser 108 may be controlled by an electronic controller 110 to generate pulses which form the laser beam 108a having a desired shape, pulse width and power level. The laser beam 108a may thus be made up of one or more laser pulses directed toward the liquid jet 104. In this example the laser beam 108a is directed along an axis perpendicular to the direction of travel of the liquid jet 104, although the laser beam need not necessarily be directed perfectly perpendicularly to the axis of flow of the liquid jet 104. However, the path of the laser beam 108a needs to intersect the region which the liquid jet 104 falls through. The shape of the laser beam 108a can be thought of as forming a "window" 109 which defines the predetermined region that the liquid jet 104 falls through. As the liquid jet 104 falls through the window 109, the laser beam 108a drives a shock wave at least substantially through, but more preferably fully through, the thickness of the liquid jet 104. The shock wave acts to compress the liquid jet 104 and to raise its temperature and/or pressure sufficiently to achieve the material synthesis which creates the carbon nanoparticles. Since the liquid precursor is in the form of a liquid jet, no containment cell or like structure is needed; that is, the liquid jet 104 can be acted on by the laser beam 108*a* as the liquid jet falls by force of gravity through an ambient environment. The created carbon nanoparticles may be in the form of solid particles or shaped like nano-onions, or they may take still further different shapes.

One example of a suitable shape for the liquid jet 104 is shown in FIG. 5. The liquid jet 104 in this example forms a generally rectangular sheet. This is but one suitable shape, and the system 100 may operate well with other liquid jet shapes. If the rectangular sheet pulse shape shown in FIG. 5 is used, then the liquid jet 104 may have a thickness on the order of around 10s-100s of microns, as denoted by arrows 104*a*, and a length on the order of about 0.1 millimeter to about 10 mm, and more preferably a length of about 1 mm, as indicated by dimensional arrow 104*b*. The preferred thickness and length of the liquid jet 104 may also be influenced by its shape (i.e., the thickness and length may differ if a different shaped liquid jet, for example a substantially spherically shaped liquid jet forming a droplet, is used). The nozzle 102, and particularly an aperture 102*a* of the nozzle as shown in FIG. 4, will therefore be selected to help impart the desired shape to the liquid jet 104.

With the system 100 shown in FIG. 4, an electronically controlled valve 106*a* may be controlled by the electronic controller 106 to help control the release of the cryogenic liquid precursor from the liquid precursor source 106. The time duration during which the valve 106*a* is opened will also influence the length of the liquid jet 104. The liquid jet 104 could also comprise a continuously flowing liquid jet. With a continuously flowing liquid jet 104, as a fresh region of liquid flows into the cross section of the laser 108, the laser compresses this cross section, and then this processed region flows out of the laser cross section, while another fresh region of liquid flow from the liquid jet 104 moves into the laser cross section. The laser 108 could be pulsed as well, although a pulsed laser beam 108*a* would not necessarily be needed. The flow rate of the liquid jet 104 may depend on how much throughput one might need. In one implementation, a flow rate of about 1 mL/minute or faster may be suitable.

With further reference to FIG. 4, the laser 108 power applied may also vary considerably to meet specific applications, but typically is on the order of 0.1-100 watts. The laser beam 108*a* diameter and/or shape may be selected and/or tailored to optimize the shock wave created in the liquid jet. A laser beam with a generally oblong or oval shape, when viewed in cross section, may be preferred, although a generally round beam shape (when viewed in cross section) may also be used. The system 100 is not limited to use with any one specific, cross sectional shape of laser beam.

The On/Off operation of the laser 108 and the opening/closing of the valve 106*a* may both be controlled by the electronic controller 110 such that the laser beam 108*a* creates one or more pulse(s) which is/are generated in timed relationship with the liquid jet 104 passing through the window 109. If a continuous flow of the liquid jet 104 is used, then a valve would not be needed. It will also be appreciated that the timing of the creation of the laser beam 108*a* (using one or more laser pulse(s)), assuming a pulsed beam 108*a* is used, will be an important factor in achieving optimal operation of the system 100. If the optional valve 106*a* is used, then the timed opening/closing action of the optional valve 106*a*, relative to the generation of the laser beam 108 (assuming a pulsed beam 108*a* is used) will be an important factor in achieving optimal system 100 operation.

The shape, length and thickness of the liquid jet 104 will be considerations in determining an optimal cross sectional shape for the laser beam 108*a*, as well as an optimal power level to be applied by the laser beam 108*a*.

In one preferred implementation the laser 108 may be a 10 s of nanosecond duration Q-switched pulsed laser with a wavelength that is absorbed by the reactant, for instance and without limitation, a 1550 nm wavelength for liquid cryogenic CO. However, the system 100 is not limited to use with any one specific type of laser.

Depending on the length of the liquid jet 104 (i.e., the dimension defined by arrow 104*b* in FIG. 5), one sufficiently long duration laser pulse may be used to form the beam 108*a*, or a series of shorter duration laser pulses 108*a* may be used to form the laser beam 108*a*. In one preferred implementation, a series of 10 s nanosecond pulses at a sufficiently high repetition rate to process all liquid that comes out of the nozzle, may be used. In practice, a pulse of the laser beam 108*a* should hit every fresh cross section of the liquid jet 104 after it refreshes. It will be appreciated then that the throughput of the system 100 is directly related to the average power of the laser 108, and also the rate of flow from the nozzle 102. The faster the flow, the higher the repetition rate of the laser 108 (thus giving higher power). There is a similar relationship between the thickness of the sheet of liquid (i.e., the liquid jet 104) generated from the nozzle 102 and the duration of the laser pulse provided by the beam 108*a*. A thicker "sheet" of the liquid jet 104 requires a longer duration laser pulse to drive the shock wave completely through the liquid jet, and a longer duration laser pulse at constant intensity will also increase the pulse energy and the average power. Similar consideration apply for the spatial diameter of the laser pulse provided via the laser beam 108*a*.

In operation, as the laser beam 108*a* impinges the liquid jet 104, the pulse (or pulses) of the beam create a shock wave in the liquid jet which propagates through a substantial portion of the thickness of the liquid jet, and even more preferably through the entire thickness of the liquid jet. The shock wave rapidly compresses the liquid jet and raises the pressure and temperature acting on the liquid jet, which synthesizes the liquid jet to cause the phase change to create the nanoparticles. More particularly, the beginning of the laser pulse provided by the beam 108*a* directly heats the surface of the liquid and causes a plasma to form. This plasma continues to absorb the remainder of the laser pulse, further heating the plasma and creating a small explosion of plasma. This explosion of plasma on the surface of the liquid creates a very rapid increase in pressure in the liquid just below the surface, driving a shock wave through the remainder of (non-plasma) liquid. This creates exhausted solid byproducts 112 and unconsumed reactants as gas. The solid byproducts 112 may optionally be collected using any suitable collection apparatus, while the gas may optionally be drawn through a suitable filter 114 before being released into the ambient atmosphere.

Figure 6:
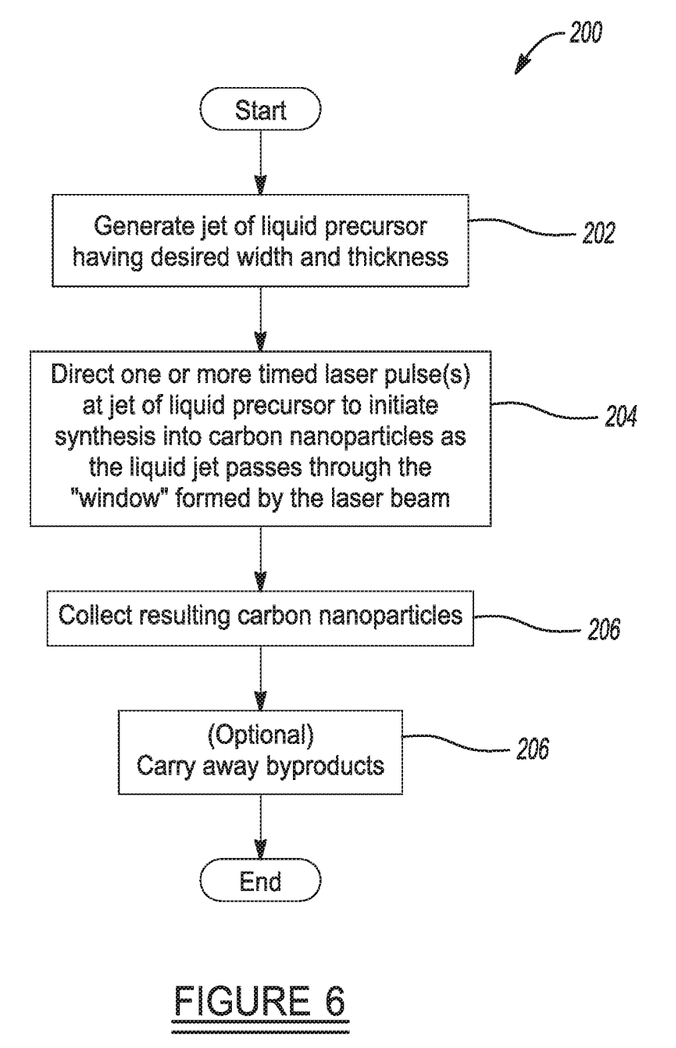
FIG. 6 shows a flowchart illustrating operations that may be performed by the system of FIG. 4 in carrying out the method of the present disclosure.

Referring to FIG. 6, a high level flowchart 200 is shown of various operations that may be carried out in accordance with the present disclosure, and for example when using the system 100 shown in FIG. 4. At operation 202 a jet of liquid precursor is initially created, for example using the nozzle 102. A beam made up of one or more pulses of electromagnetic wave energy, for example one or more laser pulses using the laser 108, may be generated and directed at the jet of liquid precursor, as indicated at operation 204. As carbon nanoparticles are created from the shock wave and resulting pressure and temperature increases, the created carbon nanoparticles may be collected, as indicated at operation 206. At operation 208, the byproducts created from the synthesis operation may be directed away from the work area or otherwise collected.

The present system 100 and the method described herein makes unnecessary the containment cell 12 shown in FIG. 1. The use of liquid jet 104 with the system 100 substantially simplifies high pressure synthesis in several respects. For one, the use of the liquid jet 104 eliminates the use of substrate solids (i.e., ablator materials), which are typically destroyed in dynamic compression and relatively difficult to exchange and replace. The liquid jet 104 also enables extremely fast exchange of precursors/reactants, thus enabling high throughput. The liquid jet 104 also enables processing of pure precursors/reactants, eliminating the possibility of contamination from, for instance, the ablator material 18 shown in FIG. 1. The use of the liquid jet 104 further enables the use of high intensity laser pulses, which have the capability to obtain arbitrarily high pressure and density. In contrast, if substrate solids are used (i.e., substrate window 16 in FIG. 1), the intensity and pressure obtained will be limited by nonlinear optical interactions in the substrate window. The use of an electronically controlled laser beam and a controlled flow nozzle therefore introduce a significant degree of control and precision in carrying out the synthesis of the liquid precursor into carbon nanoparticles, which is otherwise not possible with prior art systems and methods such as those described in connection with the prior art system 10 of FIG. 1. The laser can also be pulse shaped, which means the pressure/temperature can be modulated in time. This may be particularly useful, for example, by using a long pulse to hold the pressure for a longer period of time, enabling the growth of larger nanoparticles. This is one way in which the time distribution of laser intensity may be used to control the size of the nanoparticles.

The present disclosure thus describes a new system and method which enables nanoparticles, for example nanodiamonds, to be generated while achieving high throughput. The system and method described herein also enables nanoparticles to be created with pure material using a straightforward synthesis method. The system and method described herein does not require significant additional costly equipment or complex manufacturing procedures for its implementation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for synthesis of condensed, nano-carbon materials to create nanoparticles, the system comprising:
   a source of liquid precursor;
   a flow control element in communication with the source of the liquid precursor which creates a jet of liquid precursor exiting the flow control element; and a shock wave generating subsystem for generating a shock wave through at least a substantial portion of a thickness of the jet of liquid precursor to sufficiently compress the jet of liquid precursor, and to increase a pressure and a temperature of the jet of liquid precursor, to create solid state nanoparticles.

2. The system of claim 1, wherein the shock wave generating subsystem comprises an electromagnetic wave energy source which generates at least one electromagnetic wave energy beam directly at the jet of liquid precursor to impinge the jet of liquid precursor.

3. The system of claim 1, wherein the liquid precursor comprises liquid carbon monoxide.

4. The system of claim 3, wherein the solid state nanoparticles comprise nano-diamonds.

5. The system of claim 1, wherein the jet of liquid precursor comprises a jet shaped as a rectangular sheet.

6. The system of claim 1, wherein the jet of liquid precursor has a thickness of 10s to 100s of microns.

7. The system of claim 1, wherein the jet of liquid precursor has a length of about 0.1 mm to 10 mm.

8. The system of claim 1, wherein the jet of liquid precursor has a length of 1 mm.

9. The system of claim 2, wherein the electromagnetic wave energy beam comprises a laser pulse having an oblong shape when viewed in cross section.

10. The system of claim 2, wherein the electromagnetic wave energy source comprises a laser which generates a laser beam, and the laser beam comprises at least one laser beam pulse.

11. The system of claim 10, wherein the laser beam is comprised of a plurality of pulses.

12. The system of claim 1, wherein the flow control element comprises a flow nozzle.

13. The system of claim 1, further comprising an electronic controller configured to control the shock wave generating subsystem.

14. The system of claim 13, wherein:
the shock wave generating subsystem comprises a laser which generates a laser beam; and
wherein the system further comprises a valve operably associated with the flow control element for controlling a release of the liquid precursor to form the jet of liquid precursor, the electronic controller operating to control a release of the liquid precursor from the flow control element in timed relationship with generation of the laser beam such that the jet of liquid precursor is impinged by the laser beam as the jet of liquid precursor falls by gravity through an ambient environment.

15. The system of claim 14, wherein the flow control element comprises a flow nozzle.

16. The system of claim 1, wherein the shock wave generating subsystem comprises a laser which generates a laser beam, and wherein the laser beam is directed along an axis perpendicular to a path of travel of the jet of liquid precursor.

17. The system of claim 1, wherein the shock wave generating subsystem comprises a 10 s of nanosecond duration Q-switched pulsed laser.

18. The system of claim 17, wherein the Q-switched pulsed laser produces a pulsed beam having a wavelength that is absorbed by the jet of liquid precursor, and wherein the wavelength comprises a 1550 nm wavelength, and wherein the liquid precursor comprises cryogenic liquid carbon monoxide.

19. A system for synthesis of condensed, nano-carbon materials to create nanoparticles, the system comprising:
a source of liquid precursor;
a flow nozzle in communication with the source of the liquid precursor which creates a jet of liquid precursor exiting the flow nozzle; and
a laser for generating at least one laser pulse aimed along a path perpendicular to a path of travel of the jet of liquid precursor, to impinge the jet of liquid precursor as the jet of liquid precursor falls, the laser pulse having sufficient power to drive a shock wave through the jet of liquid precursor to sufficiently compress the jet of liquid precursor, and to increase a pressure and a temperature of the jet of liquid precursor, to create solid state nanoparticles.

20. The system of claim 19, wherein the source of liquid precursor comprises liquid carbon monoxide.

21. The system of claim 19, further comprising:
an electronic controller for controlling operation of the laser;
an electronically controllable valve controlled by the electronic controller such that the electronic controller controls a release of the liquid precursor from the flow nozzle to form the jet of liquid precursor; and
the electronic controller controlling the laser in timed relationship with opening and closing of the electronically controllable valve to time creation of the laser pulse to impinge the jet of liquid precursor as the jet of liquid precursor falls by force of gravity through an ambient environment.

22. A method for synthesis of condensed, nano-carbon materials to create nanoparticles, the method comprising:
controlling a release of a liquid precursor to create a jet of liquid precursor;
using an electromagnetic wave energy source to generate a beam directly at the jet of liquid precursor as the jet of liquid precursor falls through a predefined region intersecting a path of the beam; and
using the beam to impinge the jet of liquid precursor, the beam having sufficient power to drive a shock wave at least substantially through a thickness of the jet of liquid precursor, which compresses the jet of liquid precursor and increases both a pressure and a temperature of the jet of liquid precursor, to create solid state nanoparticles.

* * * * *